(12) United States Patent
Smyth et al.

(10) Patent No.: US 8,886,633 B2
(45) Date of Patent: Nov. 11, 2014

(54) SYSTEMS AND METHODS FOR USER INTERACTIVE SOCIAL METASEARCHING

(75) Inventors: Barry Smyth, County Wicklow (IE); Maurice Coyle, Dublin (IE); Peter Briggs, Dublin (IE)

(73) Assignee: HeyStaks Technology Limited, Nova/UCd, Belfield Innovation Park, Belfield, Dublin (IE)

( * ) Notice: Subject to any disclaimer, the term of this patent is extended or adjusted under 35 U.S.C. 154(b) by 417 days.

(21) Appl. No.: 13/069,266

(22) Filed: Mar. 22, 2011

(65) Prior Publication Data
US 2011/0231383 A1 Sep. 22, 2011

Related U.S. Application Data

(60) Provisional application No. 61/316,347, filed on Mar. 22, 2010.

(51) Int. Cl.
*G06F 17/30* (2006.01)
*G06F 7/00* (2006.01)

(52) U.S. Cl.
CPC .... *G06F 17/30693* (2013.01); *G06F 17/30867* (2013.01); *G06F 17/30522* (2013.01)
USPC ........... 707/721; 707/706; 707/733; 707/736; 707/751

(58) Field of Classification Search
CPC ................. Y10S 707/99933; G06F 17/30864; G06F 17/30867; G06F 17/30699
See application file for complete search history.

(56) References Cited

U.S. PATENT DOCUMENTS

| | | | |
|---|---|---|---|
| 7,747,632 B2* | 6/2010 | Korn et al. | 707/751 |
| 7,756,843 B1* | 7/2010 | Palmer | 707/694 |
| 2006/0042483 A1 | 3/2006 | Work et al. | |
| 2006/0069694 A1* | 3/2006 | Rossi et al. | 707/101 |
| 2007/0112761 A1* | 5/2007 | Xu et al. | 707/5 |

(Continued)

FOREIGN PATENT DOCUMENTS

WO WO 2011/117737 A1 9/2011

OTHER PUBLICATIONS

International Preliminary Report on Patentability for PCT/IB2011/001021, mailed Oct. 4, 2012 (6 pages).

(Continued)

*Primary Examiner* — Sangwoo Ahn
(74) *Attorney, Agent, or Firm* — Choate, Hall & Stewart LLP; Brenda Herschbach Jarrell; William R. Haulbrook

(57) ABSTRACT

A searching system may include a primary server with interfaces for communication with databases or with underlying search engines. The primary server may be adapted to receive a search query from a client under instructions from a user; and retrieve search results and transmit the results as a response to the client. The primary server may be adapted to store search data sets of relevant results for queries by users who are member of the set. The primary server may be adapted to select a search data set of which the user for the query is a member, and to use said search data set in providing the response to the query. The primary server may be adapted to download data concerning the selected search data set to the user. The primary server may be adapted to automatically update the search data set according to the results selected by the user.

22 Claims, 11 Drawing Sheets

(56) References Cited

U.S. PATENT DOCUMENTS

| | | | | |
|---|---|---|---|---|
| 2008/0033959 | A1* | 2/2008 | Jones | 707/9 |
| 2008/0281793 | A1* | 11/2008 | Mathur | 707/3 |
| 2009/0276233 | A1 | 11/2009 | Brimhall et al. | |
| 2009/0281988 | A1 | 11/2009 | Yoo | |
| 2010/0010987 | A1* | 1/2010 | Smyth et al. | 707/5 |
| 2010/0082604 | A1* | 4/2010 | Gutt et al. | 707/721 |
| 2010/0153285 | A1* | 6/2010 | Anderson et al. | 705/319 |
| 2010/0169339 | A1* | 7/2010 | Junqueira et al. | 707/758 |
| 2010/0228777 | A1* | 9/2010 | Imig et al. | 707/772 |
| 2011/0113100 | A1* | 5/2011 | Chawla | 709/205 |
| 2011/0179025 | A1* | 7/2011 | Chuang | 707/728 |
| 2011/0184951 | A1* | 7/2011 | Paparizos et al. | 707/737 |

OTHER PUBLICATIONS

International Search Report for PCT/IB2011/001021, mailed Jul. 27, 2011 (3 pages).

Written Opinion for PCT/IB2011/001021, mailed Jul. 27, 2011 (6 pages).

Smyth, Barry et al., "Exploiting Query Repetition and Regularity in an Adaptive Community-Based Web Search Engine", User Modeling and User-Adapted Interaction, Kluwer Academic Publishers, vol. 14, No. 5, Jan. 1, 2004 (pp. 383-423).

Smyth, Barry et al., "Google Shared. A Case-Study in Social Search", User Modeling, Adaptation and Personalization, Springer Berlin Heidelberg, Jun. 22, 2009 (pp. 283-294).

Smyth, Barry et al., "A Case-Based Perspective on Social Web Search", Case-Based Reasoning Research and Development, Spring Berlin Heidelberg, Jul. 20, 2009 (pp. 494-508).

"New Technology to Improve Internet Searching by Stacking and Sharing Information," dated Jul. 28, 2008, retrieved from the Internet on Jul. 13, 2011: http://www.ucd.ie/news/2008/07JUL08/280708_haystacks.html (2 pages).

"HeyStaks Technologies," dated Nov. 9, 2009, retrieved from the Internet on Jul. 13, 2011: http://entrepreneurship.unica-network.eu/sites/default/files/HeyStaks_Abstract_Final/pdf (1 page).

"Finalists and Winners of the Competition 2009," dated Jul. 28, 2008, retrieved from the Internet on Jul. 13, 2011: http://entrepreneurship.unica-network.eu/content/finalists-and-winners-competition-2009 (1 page).

* cited by examiner

SYSTEMS AND METHODS FOR USER INTERACTIVE SOCIAL METASEARCHING

RELATED APPLICATIONS

The present disclosure claims priority to U.S. Application No. 61/316,347, entitled "Systems and Methods for User Interactive Social Metasearching" and filed Mar. 22, 2010, the contents of which are hereby incorporated by reference in their entirety.

BACKGROUND

Current searching for information in networked systems occurs in an ad hoc manner, with results being retained according to the searcher's interests. For example, if a group of friends are planning a summer vacation and conduct much of their research by using a variety of online resources, once interesting information has been located, there are few ways for users to share this information effectively. Most often, users share their search results via email and conversation, both of which can be inefficient ways of sharing information within the group.

Further, such a system can result in wasted, duplicative research and/or missed opportunities. If a searcher neglects to bookmark a visited web site, the searcher must spend time repeating the search and re-finding the site. Additionally, because users filter search results for results that meet their requirements, they are unlikely to communicate results that do not meet all of their criteria to other users. In this manner, other members of the group can remain ignorant of results located by another user. Thus, the group as a whole may fail to become aware of results that could have offered good compromises with respect to the members' needs had the results been communicated to the group.

Current searching can also occur without regard to the context of a user's field of search. For example, someone who runs a specialist portal relating to vintage cars may wish to bring together a database of information on such cars. However, when users of the portal input a search query for "jaguar photos," the portal may return wildlife-related results in addition to, or even ahead of, car results.

SUMMARY OF THE DISCLOSURE

In some aspects, the present disclosure is related to a searching system comprising a primary server comprising interfaces for communication with databases or with underlying search engines. The primary server may be adapted to receive a search query from a client under instructions from a user and retrieve search results and transmit the results as a response to the client. The primary server may be adapted to store search data sets of relevant results for queries by users who are member of the set. The primary server may be adapted to select a search data set of which the user for the query is a member, and to use said search data set in providing the response to the query. The primary server may be adapted to identify a search data set that contains search data relevant to the query. The primary server may recommend the search data set to the user. The primary server may be adapted to download data concerning the selected search data set to the user. The primary server may be adapted to automatically update the search data set according to the results selected by the user.

The primary server may be adapted to automatically generate the search data set according to tagging of results by members of the search data set. Tagging may include a vote quantifier applied by a member to a result. The search data set may include both Web site and individual Web page results. The primary server may be adapted to apply an identifier to the search data set in response to a user instruction and to associate members with the search data set in response to user instructions.

The searching system may include a social network server adapted to communicate with the primary server and to manage a plurality of search data sets. The primary server may be adapted to communicate with the social network server to update and select the search data set. The primary server may be a Web server and may be adapted to operate a Web site which allows interaction with the social network server for associating members with the search data sets. The searching system may be adapted to transmit invitations to users identified in the social network server to become members of search data sets. The searching system may be adapted to manage compound search data sets containing related search data sets.

The primary server may be adapted to download to a client a software agent having software code and settings allowing access by the client to the primary server. The primary server may be adapted to create a new search data set, share search data sets with other users, and allow the client to share individual search data set items directly with other users or with entire communities of which they are a member, allow the client system to share individual search data items directly with other users or with entire communities of which they are a member by means of a single click on a button or control, and provide users with lists of search data sets of which they are currently members.

The software agent may allow the client to resubmit a query to the primary server upon selection of a search data set, retrieve a recommendation relevant to a selected search data set, automatically identify and select a search data set suitable to a current search by analysis of a current search context, output recent search activity and search statistics, and select a search data set suitable to a search as a query is being entered, with dynamic updating of the selection.

The software agent may allow the client to, under user instructions, enter a search query including a trigger to identify which search data set they would like to search in the context of, re-rank and annotate the results of the response using historical usage information derived from the search data sets, and augment the results of the response with additional results taken from a search data set that is identified as being relevant to a current search.

The software agent may allow the client to process historical information associated with results taken from a search data set as part of evidence-based filters to decide upon a result's relevance to a current search, use reputation information derived from historical actions of search data set members to adjust the ranking of results selected by those members when recommending those results in response to new queries, access a tagging function whereby a result can be tagged with a set of keywords and added to a search data set, re-use page tags provided by users to augment a response to a query whose terms overlap with tag terms or a result, and allow users to populate search data sets with data from external sources, for integration with existing set data or to seed new sets.

The software agent may allow the client system to export search data set content in a format that may be imported into external data sources or stored for backup purposes, and generate a compound search data set that draws upon the content of other search data sets when identifying suitable historical search information to present the end-user with.

The software agent may allow the client system to navigate through the results with results being pre-cached to improve response times, allow the user to tag or share a previewed result, or to open the result in a new browser tab, and configure search settings.

A user's reputation score may be calculated based on the extent to which their search actions within a particular search data set assist other users to locate relevant information. The primary server may be adapted to embed widgets in external Web pages or Web page containers, providing users with access to content. The primary server may be adapted to control a Web site providing each subscribed user with access to pages that provide access to data feeds concerning recent activity in a user's search data sets, tools for filtering recent activity data under a category, a set list, showing search data sets that the user is a member of and giving summary information on each, a display of a user's search communities, search data set recommendation, enabling a user to be recommended sets that they might be interested in joining, searching for results that have previously been selected in a search data set by entering queries, and browsing a search data set of which the user is a member and public search data sets.

The primary server may be adapted to enable the user to apply settings on each search data set of which they are a member. Settings may include extent of access to data concerning other users of a service for the search data sets, and whether searching actions will result in the search data set content being updated. The primary server may be adapted to allow an owner of a search data set to set permissions on the search data set at a global, individual, or role-based level, to control whether different searching actions will result in the set content being updated.

The system may include an automatic update component adapted to automatically download any update-codes that are available from an appropriate update server, said update codes providing instructions for parsing additional underlying search engines so that search data sets include results that have been selected as part of other search engine result-lists and so that results from search data sets can be inserted as part of other search engine result lists.

The primary server may be adapted to download a software agent to the client system to allow a user to benefit from results that have been selected from different search engines, wherein new search engines can be added in update codes, and whereby the user benefits from results from different search engines without needing to access separate meta search engines. The primary server may be adapted to provide an interface that allows any software agent to utilize the functionality of the server engine.

BRIEF DESCRIPTION OF THE DRAWING

The foregoing and other objects, aspects, features, and advantages of the present disclosure will become more apparent and better understood by referring to the following description taken in conjunction with the accompanying drawing, in which.

DETAILED DESCRIPTION OF CERTAIN EMBODIMENTS

In general overview, the present disclosure relates to systems and methods for user interactive social metasearching. A user may submit a search query on a topic of interest to a search engine, and the search engine may retrieve search results relevant to the query. In tandem, a server engine may retrieve search results relevant to the user's search query from a stak relevant to the topic of interest. The server engine may identify search results from the stak to bring to the user's attention. The server engine may promote such search results by integrating the search results into the list of results from the search engine, highlighting the search results, advancing the search results' position in the list of displayed results, and/or displaying the search results in a separate area of a display. As the user selects, tags, or otherwise indicates an interest in a search result, information about the user's activity may be added to the stak, thereby enhancing its search knowledge.

The present disclosure describes, among other things, systems and methods for user interactive social metasearching. Using the systems described herein, individual users and groups of users may organize their searches, benefit from other users' search experiences, and share their search experiences. One or more users' search knowledge (e.g., queries submitted to search engines, selections of results from search engines based on the queries) may be organized into search data sets (also referred to as "staks"). Staks may serve as repositories of search experiences. As users search in conjunction with a stak, their searches may be enhanced by search results from the staks. In turn, search knowledge from their own search activity may enhance the stak. Thus, users may benefit from the collective search knowledge of the stak members while benefiting future users.

Figure 1:
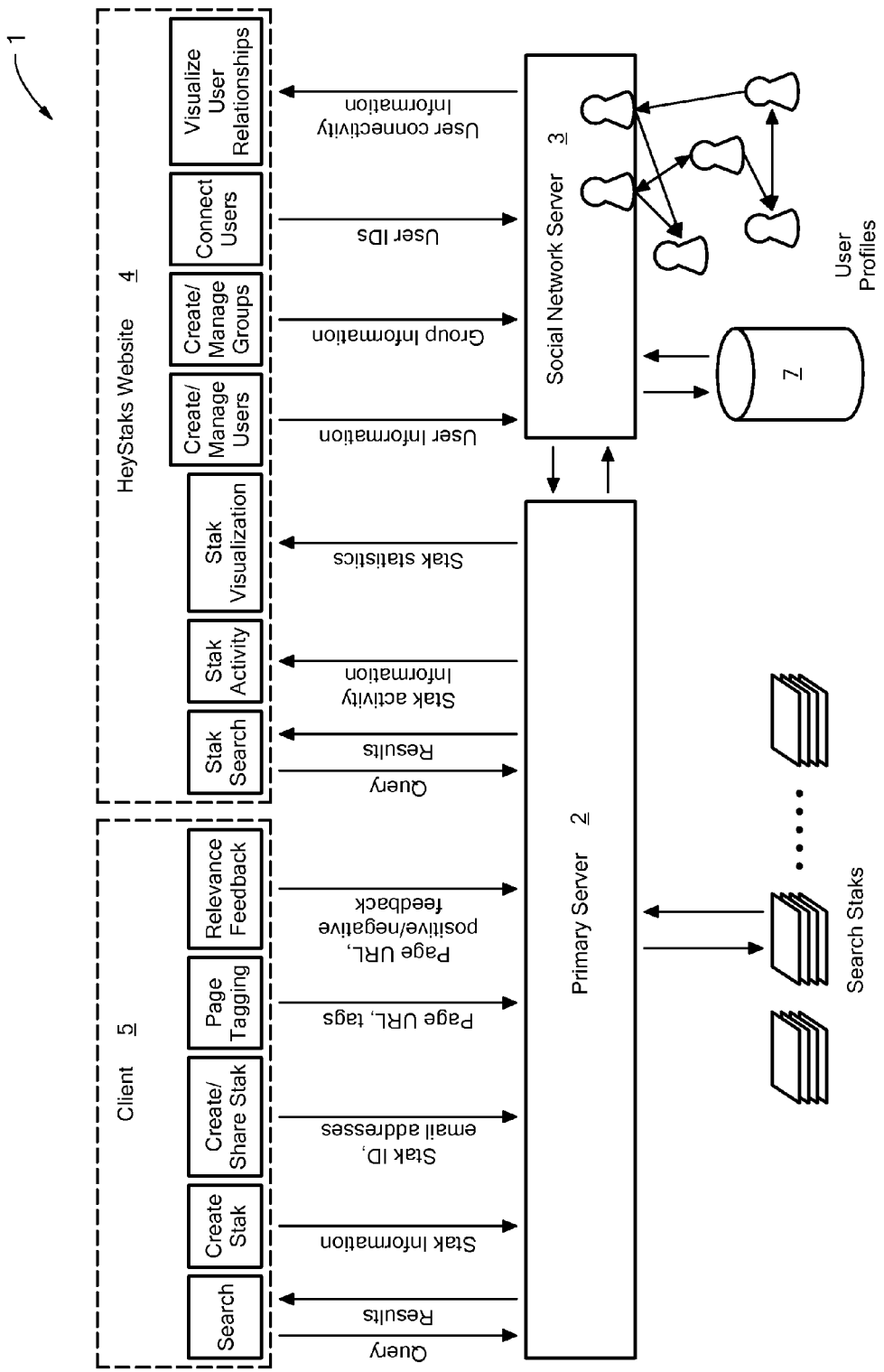
FIG. 1 is a block diagram of an exemplary system for user interactive social metasearching.

Referring now to FIG. 1, a block diagram of an exemplary system 1 for user interactive social metasearching is shown and described. A primary server 2 stores staks and communicates with a social network server 3 (collectively referred to as the "server engine"). Users of the system 1 interact with the server engine via a client 5. Through the client 5, a user may access a web site 4 hosted by the primary server 2. A software agent, executing on the client 5, enables integration between the search engines that users access via browsers, by way of example, and functionality provided by the server engine (e.g., stak management, automatic stak selection, result promotion). The website 4 provides an interface that enables users to, among other things, manage their staks, monitor their search and/or stak activity, share and/or discover knowledge about searching for particular topics via social networking features, search for staks to enhance their own searches, and discover new content. The server engine provides capability to execute the features offered on the website 4. The social network server 3 communicates with a user profile database 7 to obtain information about users of the system.

In some embodiments, the server engine includes an API interface. Through this interface, a developer may create a client that may access the server engine's functionality. Developers may customize clients according to their needs while leveraging the server engine's capabilities.

Figure 2:
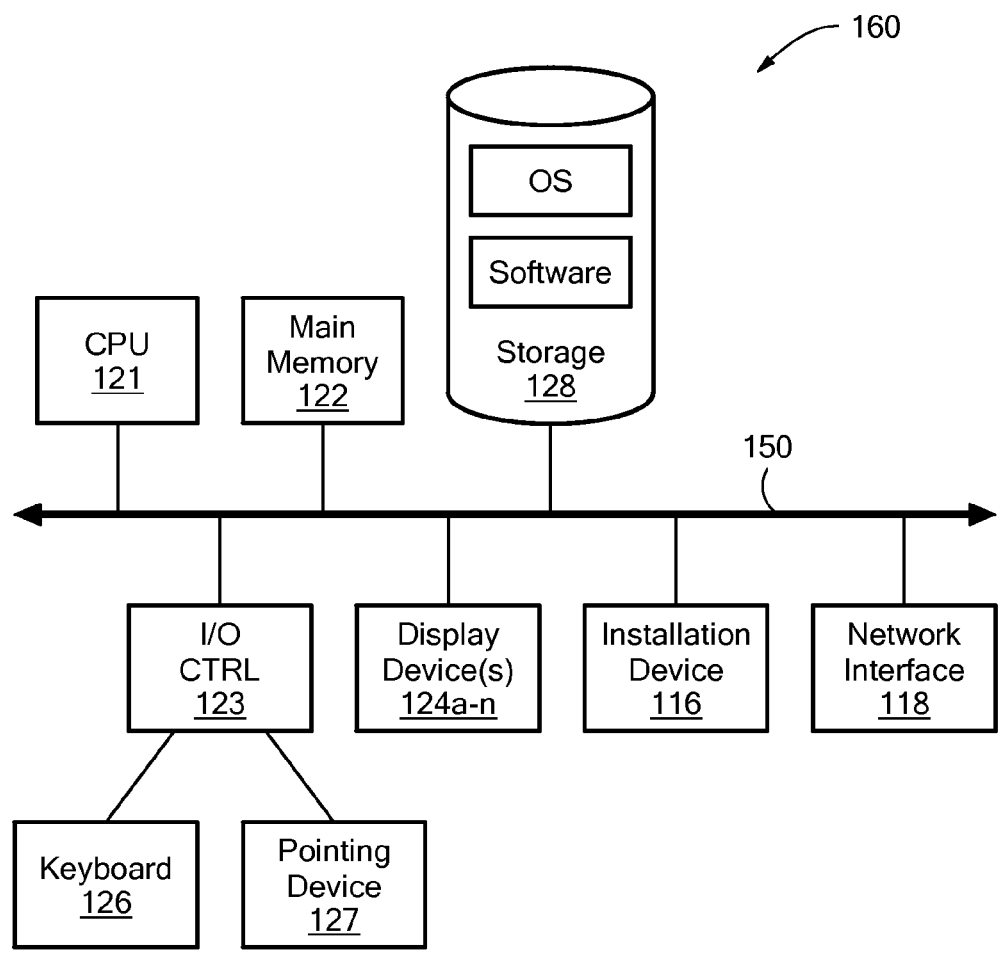
FIGS. 2 and 3 are block diagrams of exemplary computing devices for the client or servers in the system of FIG. 1.
Figure 3:
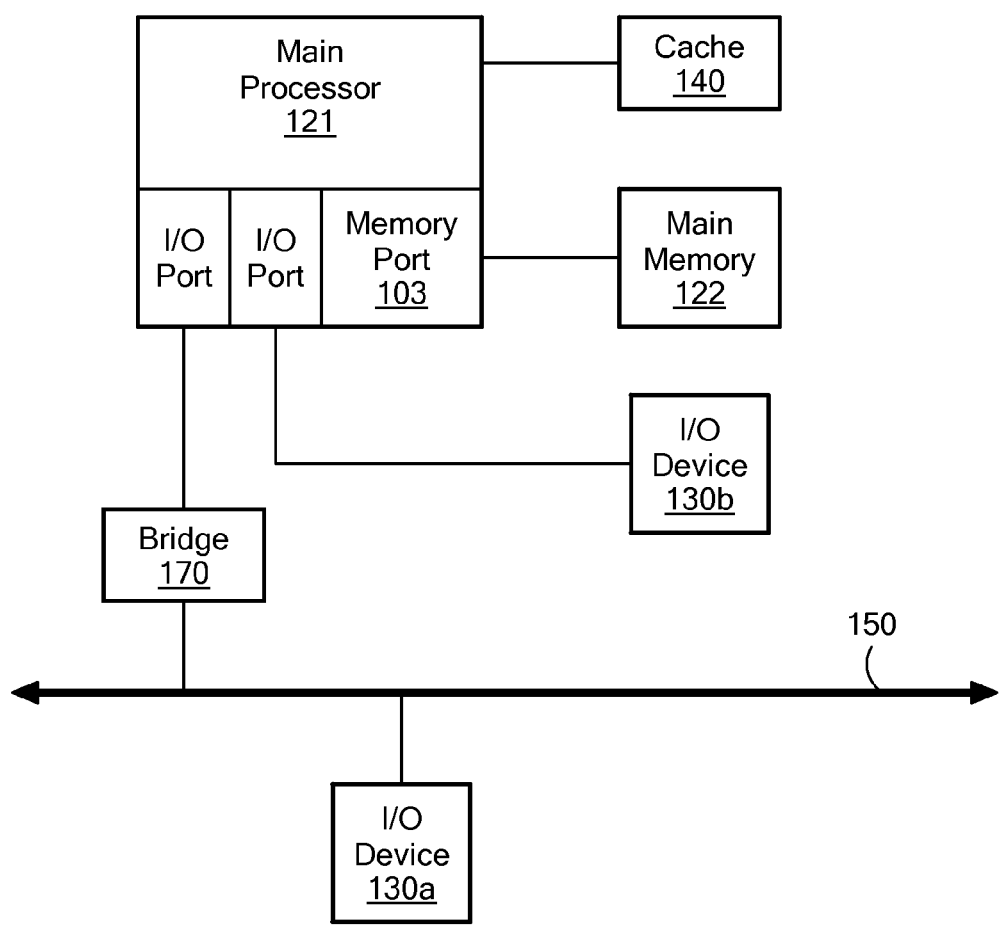

Referring now to FIGS. 2-3, block diagrams of exemplary computing devices for the client or servers in the system 1 are shown and described. A computing device 160 may include a central processing unit 121, and a main memory unit 122. As shown in FIG. 2, a computing device 160 may include a visual display device 124, a keyboard 126 and/or a pointing device 127, such as a mouse. As shown in FIG. 3, a computing device 160 may also include additional optional elements, such as one or more input/output devices 130a-130b (generally referred to using reference numeral 130), and a cache memory 140 in communication with the central processing unit 121.

The central processing unit 121 may any logic circuitry that responds to and processes instructions fetched from the main memory unit 122. In many embodiments, the central processing unit may be provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 160 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 2, the processor 121 may communicate with main memory 122 via a system bus 150 (described in more detail below). FIG. 3 depicts an embodiment of a computing device 160 in which the processor communicates directly with main memory 122 via a memory port 103. For example, in FIG. 3 the main memory 122 may be DRDRAM.

FIG. 3 depicts an embodiment in which the main processor 121 may communicates directly with cache memory 140 via a secondary bus, sometimes referred to as a backside bus. In other embodiments, the main processor 121 may communicate with cache memory 140 using the system bus 150. Cache memory 140 may have a faster response time than main memory 122 and may be provided by SRAM, BSRAM, or EDRAM. In the embodiment shown in FIG. 3, the processor 121 may communicate with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 3 depicts an embodiment of a computer 100 in which the main processor 121 communicates directly with I/O device 130b via HyperTransport, Rapid I/O, or InfiniBand. FIG. 3 depicts an embodiment in which local buses and direct communication may be mixed: the processor 121 may communicate with I/O device 130a using a local interconnect bus while communicating with I/O device 130b directly.

The computing device 160 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 160 may further comprise a storage device, such as one or more hard disk drives or redundant arrays of independent disks, Flash memory, or EEPROMs, for storing an operating system and other related software, and for storing application software programs. Optionally, any of the installation devices 116 may be used as the storage device. The operating system and the software can be run from a bootable medium, for example, a bootable CD, such as KNOPPIX®, a bootable CD for GNU/Linux that is available as a GNU/Linux distribution from knoppix.net.

The computing device 160 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections may be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 160 may communicate with other computing devices via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 160 to any type of network capable of communication and performing the operations described herein.

A wide variety of I/O devices 130a-130b may be present in the computing device 160. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 160. In still other embodiments, the computing device 160 may provide USB connections to receive handheld USB storage devices such as the USB Flash Drive line of devices manufactured by Twintech Industry, Inc. of Los Alamitos, Calif.

In some embodiments, the computing device 160 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 160. For example, the computing device 160 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 160 may include multiple video adapters, with each video adapter connected to one or more of the display devices 124a-124n. In some embodiments, any portion of the operating system of the computing device 160 may be configured for using multiple displays 124a-124n. In other embodiments, one or more of the display devices 124a-124n may be provided by one or more other computing devices, such as computing devices 100a and 100b connected to the computing device 160, for example, via a network. These embodiments may include any type of software designed and constructed to use another computer's display device as a second display device 124a for the computing device 160. One ordinarily skilled in the art will recognize and appreciate the various ways and embodiments that a computing device 160 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 160 of the sort depicted in FIGS. 2-3 may operate under the control of operating systems, which control scheduling of tasks and access to system resources. The computing device 160 may be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Exemplary operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The computer system 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

Figure 4:
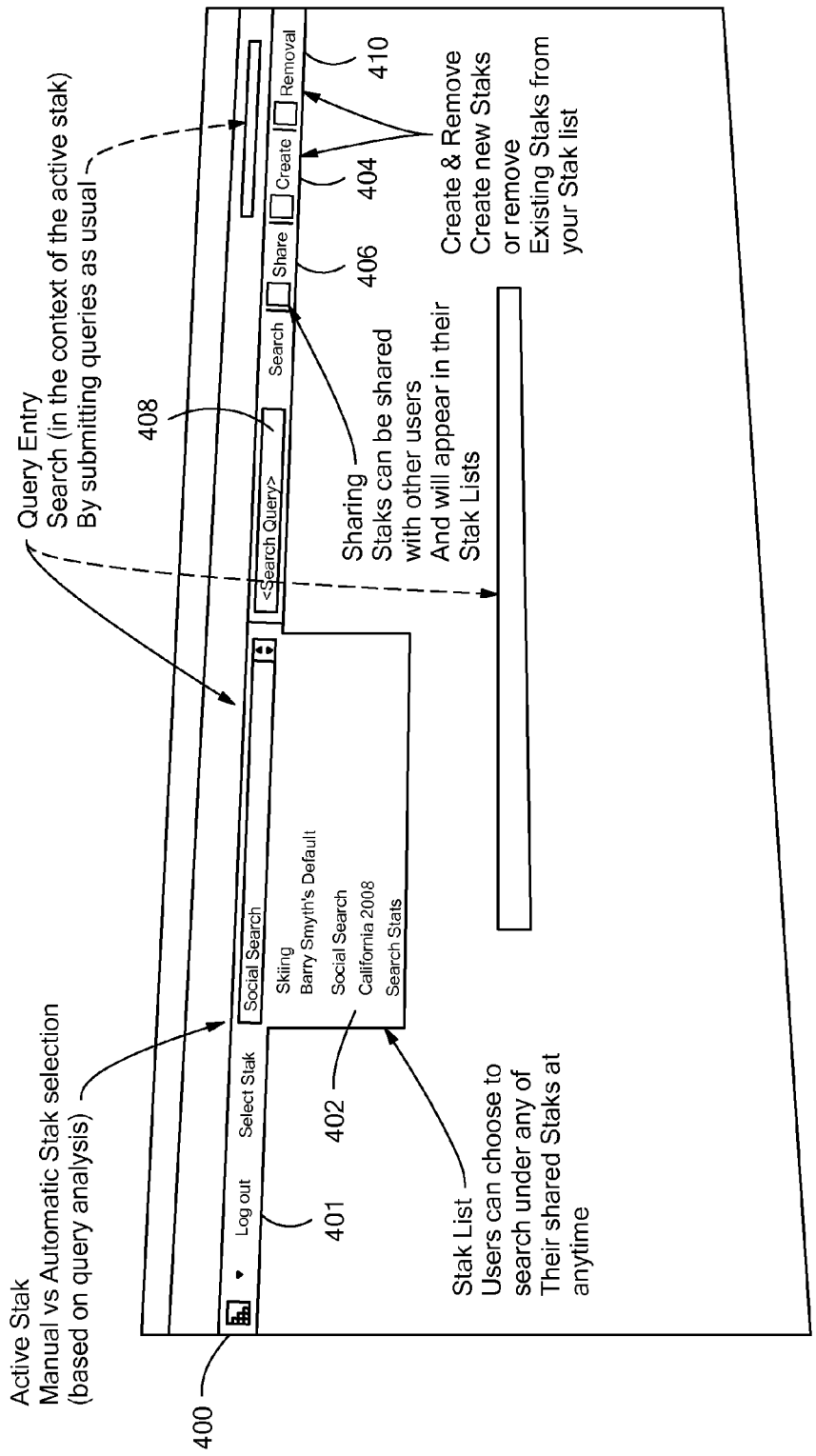
FIG. 4 is an exemplary user interface associated with a software agent executing on the system of FIG. 1.

Referring now to FIG. 4, an exemplary user interface 400 associated with a software agent executing on the system of FIG. 1 is shown and described. In this implementation, the user interface for the agent may be implemented as a toolbar integrated into a network browser. The software agent may provide users with browser-based access to functionality on the server engine (e.g., stak creation and management, user preferences, user accounts). The software agent may enable seamless integration between the server engine and search engines that the user accesses. Thus, search results from a third-party search engine may be enhanced with information from the server engine, by way of example.

The toolbar may provide users with access to functions for controlling and configuring the system 1. An exemplary function is log-in/log-out 401. A user may provide credentials to the server engine via the user interface 400. Thereafter, the software agent may communicate with the server engine and the user may leverage the staks stored on the primary server 2. In some embodiments, users may be allowed to store their credentials (e.g., username and password) on their client 5 to enable automatic log-in via auto-population of credential fields.

The user interface 400 may include an active stak list 402. Through this list, users may access the staks that the users belong to via, for example, a drop-down list. Users may select a stak to augment a search, thereby providing a context for the search that organizes the search results or acts as a source of search result promotions. The user interface 400 may include an icon for creating a stak 404. Selection of the icon 404 may redirect the user to the web site 4 for creating a new stak. The user interface 400 may include an icon for sharing staks 406. The user interface 400 may include a query box 408 for receiving search queries. The query box 408 may be integrated with one or more search engines for retrieving results for the search query. The user interface 400 may include an icon for deleting a stak 410 that a user owns.

When the user submits a search query, the user may select a search engine to perform the query. In some embodiments, the user interface 400 may support multiple search engines. The user may submit the query to multiple search engines, and the results may be aggregated into a single list of results.

In some embodiments, the user does not manually select a stak for the search due to forgetfulness, imperfect knowledge of the staks' contents and/or effectiveness, or any other reason. The software agent may communicate the search query to the server engine. The server engine may select a stak from the user's list of staks that may be an source of search knowledge corresponding to the search query. In some embodiments, the server engine selects a stak if the user has enabled an automatic stak selection feature. The software agent and/or user page may default to enablement of this feature. The user may disable the feature. When the server engine and/or software agent automatically select a stak, the engine or agent may alert the user that a stak has been selected. Thus, if the user does not wish to search within the selected stak context, the user may deselect the stak and/or select a different stak.

Automatic selection of the stak may be based on, for example, the terms in the search query, the user's search history, any other information the server engine has about the user's search activity, or any combination thereof. Further exemplary factors for the selection may include selected search results in the staks, terms stored as part of each stak's index, the selected results' titles and descriptions, the size of the stak's membership, and/or activity levels for the stak (e.g., volume, time-lapse since the most recent use of the stak).

In some embodiments, the server engine may score and rank the staks. Exemplary scoring functions may be based on metrics such as as term popularity and/or frequency or term frequency-inverse document frequency (TF-IDF) scores. The server engine may select the highest ranking stak from the user's list of staks. The server engine may consider factors such as the frequency of the stak usage and/or the time-lapse since the most recent use of the stak.

In some embodiments, the server engine selects the default stak of the user. The default stak may be a stak with search knowledge based solely on the user's prior search queries, results, and tags, and/or other activities. The server engine may select the default stak when the user does not select a stak or the server engine does not find a stak appropriate to the search query (e.g., the search query relates to an interest that diverges from interests reflected in the user's staks). Selecting the default stak may prevent search knowledge about the user from being lost.

When the software agent displays the results of a search, for each result, the interface may include a description of a page or a portion of a page identified by the result's URL. The user interface may include a tool for previewing a page or a portion of a page.

The user interface may include tool for tagging (not shown). In some implementations, by selecting the tool for tagging, a user may tag the webpage on the browser (e.g., an arbitrary webpage or a search result) with a description (e.g., keywords), add the webpage to a stak, or both. In this manner, users may augment the index of a stak (or a search engine) with web pages that ordinarily may not appear for search queries with the tag keywords, that may appear with a lower rank among the search results, or that may not exist in the stak or search engine's index. In some embodiments, the server engine automatically selects the stak to which the tagged webpage shall be added, thus providing a stak when the user does not manually select a stak. Thus, users may add resources to their staks to benefit themselves or other members, as well as benefiting from the resources added by other stak members.

The user interface may include a tool for sharing a webpage (not shown). By selecting the web page sharing tool, the user may inform users who are connections, members of a stak, or members of a community about the web page on the browser. In some embodiments, the user may share the web page by selecting a button or other control on the user interface. The user may input the e-mail addresses, usernames, or other identifying information of the individuals or groups with whom the user wishes to share the web page. In response, the server engine may e-mail or otherwise inform the recipients of the web page.

The user interface may include a social networking sharing tool (not shown). By selecting the social networking sharing tool, the server engine may transmit information about the web page open on the user's browser to a social networking site (e.g., Facebook, Twitter). The server engine may transmit information about the web page to the social networking accounts in the user's profile. In some embodiments, information about the web page is associated with the user account in a manner that makes the information viewable to the user's connections. For example, a social networking site may load information about the web page into the user's news feed. In another example, a social networking site may update a status of the user to include information about the web page, thereby broadcasting information about the web page to the user's connections.

In some implementations, the user interface 400 provides features that allow users to provide feedback on search results. For example, the user interface may include a control through which a user provides explicit positive or negative feedback for a search result (e.g., "thumbs up" and "thumbs down" icons). The user interface may include a tool for voting on the search result. The server engine may record the user feedback. The relevance score of the search result, described in more detail below, may account for the user feedback.

The software agent may allow the user interface 400 to be configured according to user preferences (e.g., user settings). The user may configure the software agent to access search engines of the user's choosing. In some embodiments, the user interface 400 may be modified according to the user's geographic location. The user interface 400 may be modified based on user memberships in various staks. The user interface 400 may be modified to include selected search engines and websites and exclude others to tailor the search tools to the user's interests and needs. In some embodiments, the user interface 400 may be configured to accommodate the technical capability of the user's client 5.

In some implementations, when the user selects a search result retrieved in response to a search query, the user selection may update the stak in which the search query was carried out. The server engine may update the stak's search index with, e.g., information about the user's search query, the URL of the selected result, the snippet text associated with this result, the time of the selection, and/or the identification information of the user making the selection. In some implementations, the user may tag, share, comment, vote on, or perform any other action reflecting the user's interest in the search result. The server engine may update the stak with any of the user's actions with respect to the search result.

In some embodiments, the server engine updates a search index using standard indexing functions. Thus, the selected result URL may be indexed using a combination of the terms in the search query and the terms in the snippet text. Prior to the update, the snippet terms may be processed to remove stop-words. In some embodiments, time and user information may be stored.

In some implementations, when the user searches via a compound stak, the server engine may update the compound stak and not the linked simple staks, thereby preventing contamination of the linked staks.

In some embodiments, the software agent may include code to interpret search engine results. The software agent may track when a user clicks a search result and/or interact with the search engine to promote search results based on information from a stak. The software agent may include an automatic update feature. The software agent may make periodic requests to the server engine for code updates and download any available updates. In this manner, the server engine may synchronize with the software agent so the agent may retain functionality when, for example, search engines change their result page format and/or the server engine and agent become compatible with an increased number of search engines. In some embodiments, the server engine accepts software agents created by third parties. Thus, in some implementations, third parties may add new search engines to the software agent and leverage the server engine's capabilities, rather than waiting for the agent to become compatible with the search engine.

In some embodiments, the user interface 400 for the client 5 may be implemented as a Javascript "bookmarklet", a separate network browser, a standalone application for a computing device, an add-on for a search tool executing on the computing device, a widget embedded in a web site, or a widget for delivering search results to a mobile device.

Figure 5:
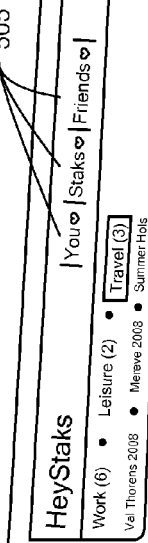
FIG. 5 is an exemplary web site for user of the system of FIG. 1.

Referring now to FIG. 5, an exemplary web site for users of the system (also referred to herein as a "user page") of FIG. 1 is shown and described. The user page 500 may complement the software agent the user uses by replicating the agent's functionality and providing additional functionality from the server engine. The user page 500 may deliver a social network experience revolving around search activities. Users may use their pages to access their accounts with the server engine. The user pages 500 may display the staks the users have created or joined, as well as information about recent activities within the staks (e.g., recent and popular queries and results, active users).

In further detail, the user page 500 may include a tool 505 for managing a user account. Through this tool 505, a user may manage, for example, his or her username, password, screenname, created staks, shared staks, user connections, preferences, and thresholds. For example, the user may edit or manage staks they own by deleting search results from a stak or moving search results between staks. The user may view his or her search history.

The user page 500 may provide an activity feed 510 (also referred to herein as a "news feed") that lists the recent search activity in staks the user belongs to. The activity feed 510 may display search results that stak members selected and the search queries used to find the results. The activity feed may display news of new members who have joined staks. The activity feed may alert the user to search results for a stak that have been recently tagged.

The user page 500 may include a display of the staks the user belongs to and may include summaries of each stak 515. Graphs may provide a visual summary of these staks' levels of activity. In some embodiments, staks are public and accessible to any user of the server engine. Public staks are thus open to all searchers. In some embodiments, staks are private. In some implementations, a user may join a stak only by accepting an invitation from an owner and/or member of the stak.

The user page 500 may include a display of the users that the user is socially connected to 530. The user may view the profile of another user by selecting an icon or image associated with that user. Based on the profile, the user may review the connection's search history. The user may review the staks that their connection belongs to and finds useful. From the connection's user page, the user may join staks that the connection belongs to. The user may chat with the connection or leave comments on the connection's user page.

The user page 500 may include a display 525 that recommends staks the user may be interested in joining. The user page 500 may make the recommendations based on the user's staks and recent search histories, by way of example. In some implementations, the recommendations may be based on commonalities between, e.g., the search query, tagging, and search result selection behavior of the user and of fellow stak members. In some implementations, the recommendations may be based on the user's stak history. Thus, new staks may be recommended due to their similarity or relationship to the user's created or subscribed staks. The server engine may recommend staks according to any number of techniques. Content-based techniques may be used to recommend staks that share similar index terms. Collaborative filtering techniques may be used to recommend staks whose subscription lists include users who belong to similar staks as the user.

In some embodiments, the server engine depicts a network visualization to identify potential staks of interest to the user. For example, a visualization may position the user in a graph that represents his relationship with other users. When two or more users subscribe to the same stak, submit similar search queries, or select similar search results, the visualization may depict an edge. The graph may identify users whose staks or other search knowledge may be useful to the user. In response, the user may join a stak or add another user as a connection. In another example, a visualization may depict staks and the relationships among the staks. In some implementations, the visualization may depict edges between the staks based on a number of factors, such as stak membership overlap, search query term overlap, and/or co-occurrence of URLs in the stak indexes, among other factors.

The user page 500 may include a query box 530 through which a user may search for, e.g., staks, search results, or users. For example, the user may enter a query in the query box 530 to search for results that have previously been selected in one of their staks. Users may search for search results within all or a subset of the staks to which they belong. Previously selected search results for the query or for similar queries may be returned to the user. In another example, the user may select terms from a tag cloud to filter the stak activity. In another example, the user may submit a search query to discover relevant staks based on search queries or results that are popular within those staks. Staks may be identified based on matching terms in, for example, their titles, description, queries, tags, and/or stak index.

The search results may be organized as a ranked list of relevant staks. Information about the staks may include their titles, descriptions of their search subject matter (e.g., the description provided by the owner upon creation), owners, membership information (e.g., number of members), size of the stak index, activity information (e.g., frequency of use in searches, how recently the stak has been used in a search), and/or recent and popular queries. Any of the information about the stak may be used to determine its ranking in the list of staks returned to the user. For example, usage levels in the activity level may be weighted such that relevant and popular staks are ranked above less relevant or popular staks. Once a user identifies a stak relevant to his or her needs, the user may select the stak to search its index, e.g., either through the software agent or the web site 4. In some embodiments, the user may link a stak to one or more pre-existing staks to augment search results for an undertaking.

In some embodiments, users may search for other users with similar interests based on e.g., their email addresses, search queries and tags, selected search results, and staks.

The user page 500 may include a query cloud (not shown). The query cloud may show popular search query terms across the user's staks. When the user selects terms in the query cloud, the user page 500 may display the search results that other stak members selected, the search results tagged with the selected terms, or both.

Figure 6:
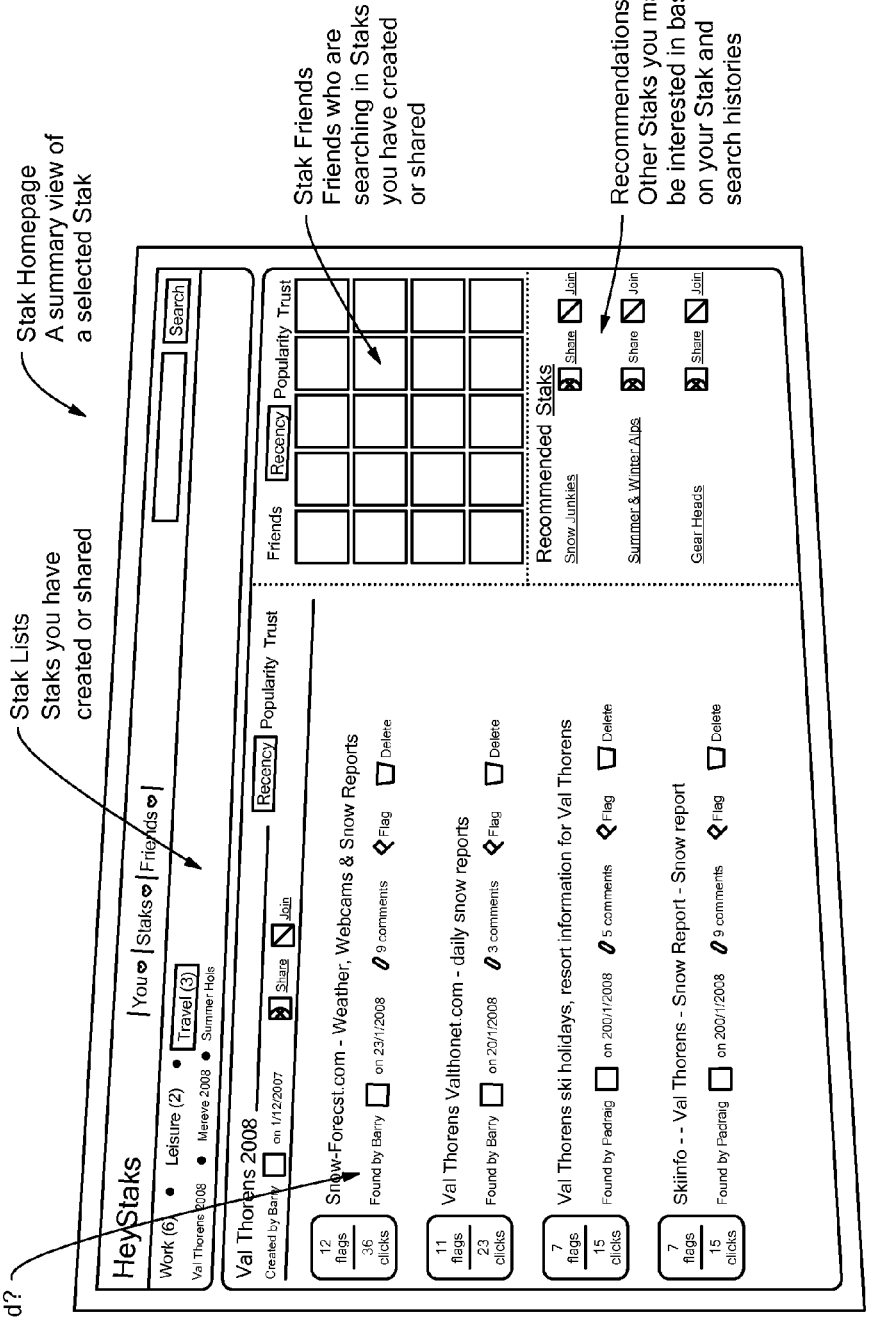
FIG. 6 is an exemplary web site for a stak used in the system of FIG. 1.

Referring now to FIG. 6, an exemplary web site for a stak (also referred to herein as a "stak page") used in the system of FIG. 1 is shown and described. A stak page 600 may provide detailed information about the stak. For example, the stak page 600 may display search results that members of the stak have selected, tagged, bookmarked, or otherwise noted. The stak page 600 may organize the search results by popularity, time of selection, or any other metric. Graphs may display information such as the number of search queries and search result selections per day or the number of stak members. Relationships among stak members may be viewed in visual form, showing how their search activities may overlap.

For stak owners, the stak page 600 may provide administrative functionality. For example, stak owners may manage the membership of the stak. Stak owners may invite users to join the stak. In some implementations, if an owner concludes a user is introducing spurious results into the stak (e.g., promoting their own web pages, which may not benefit the stak members), the owner may delete the user from the stak. In some implementations, owners may manage the search queries and search results associated with the stak. For example, the owner may delete irrelevant queries and results or move the queries and results to another stak. In some embodiments, users of a public stak may delete search knowledge from a stak.

In some embodiments, the stak page 600 may include a tool to join the stak (not shown). When a user selects the join option for a public stak, the server engine may add the user to the stak membership. The stak appears in the user's list of staks displayed on the user's software agent or user page 600.

When a stak is private, the membership may be closed to the general public while information about the stak is still viewable via the stak page 600. In these embodiments, the stak page may include a tool for requesting membership. If the user wishes to become a member of the stak, the user may select the request membership tool. The server engine sends to the owner of the stak a communication, such as e-mail, indicating the user wishes to join the stak. If the owner approves the request, the server engine adds the user to the membership of the private stak. If the owner does not approve the request, the server engine sends the requesting user a communication indicating that the request has been denied.

Figure 7:
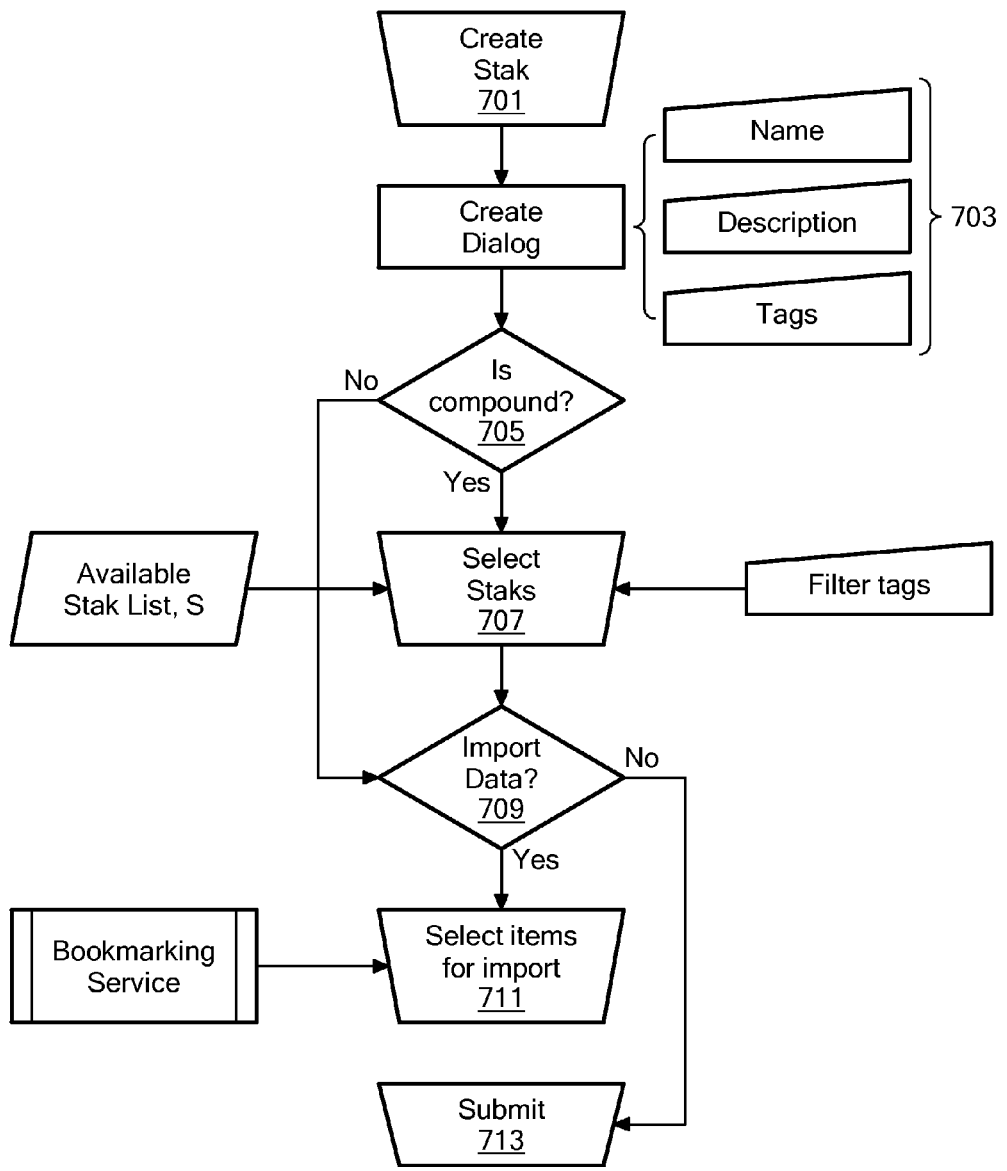
FIG. 7 is a flow diagram for an exemplary method of creating a stak.

Referring now to FIG. 7, a flow diagram for an exemplary method of creating a stak is shown and described. From either the user interface 400 associated with the software agent or the user page 500, a user may create a new stak (step 701). The user may select the name of the stak, provide a description of the subject matter of the stak, and/or tag web pages as selected resources for the stak (step 703). In some embodiments, the user's name or screenname may be associated with the stak. In some embodiments, the stak name and name of the stak creator may uniquely identify the stak.

In some implementations, the user may determine if the stak shall be simple or compound (step 705). A simple stak may be a standalone stak. A compound stak may be linked with one or more staks. Searches performed within the context of the compound stak may benefit from augmentation from the linked staks (e.g., promotions arising from the linked staks). Combining multiple search staks may allow stak creators to assemble comprehensive search knowledge to provide broad coverage for a topic of interest.

If the stak is a compound stak, a user may select staks to link to the new compound stak (step 707). In some embodiments, the user manually selects one or more staks from a list of available staks for linking In some embodiments, the user may apply a filter to the list of available staks for linking to identify relevant staks for the new compound stak. By entering terms (e.g., tags) into the filter, the server engine may identify and/or rank staks whose fields (e.g., title, description) match the terms. The user may select public staks or private staks to which they belong.

In some implementations, the user may import data into the new stak to seed the stak's search knowledge (steps 709 and 711). Exemplary search knowledge may include search query terms, tags, and URLs. In some implementations, tags may be entered into the new stak as search queries. URLs may be entered into the new stak as selected search results. Other data may be imported such that the server engine may form associations with imported terms as terms for a search query and/or form associations with identified web pages as search results. In some examples, the server engine may analyze the content on webpages associated with received URLs and/or anchor text provided by a web publisher for a hyperlink to identify terms for search queries.

In some embodiments, the user may instruct the server engine to import search knowledge from, e.g., an online bookmarking service or the user's own bookmarks. In some embodiments, the user imports search knowledge from a recommender system, social networking sites, web feeds, and/or rich site summary (RSS) feeds. In some embodiments, the user may specify a list of URLs. When other members of the stak search using the stak and the listed URLs appear in the search results, the stak may promote or demote the URLs according to the user preference. Although importing data is described herein in the context of importing data for a newly created stak, users may import search knowledge from third-party resources at any time after stak creation.

After data is imported, the user may submit the newly created stak to the server engine for storage (step 713).

Figure 8:
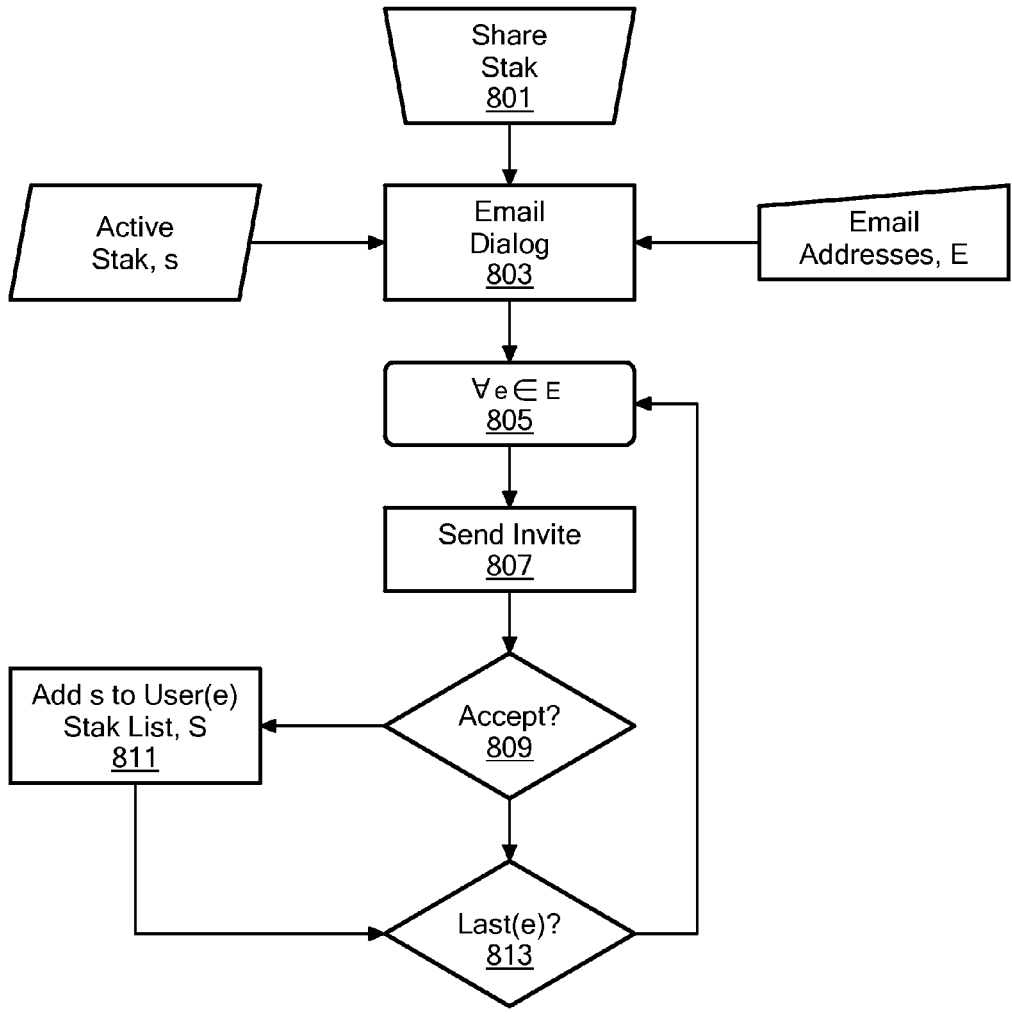
FIG. 8 is a flow diagram for an exemplary method of sharing a stak.

Referring now to FIG. 8, a flow diagram for an exemplary method, according to some implementations, of sharing a stak is shown and described. In some implementations, the user may select a tool for sharing a stak from the user interface 200 associated with the software agent, the user page 500, or the stak page 600 (step 801). The user may submit usernames and/or email addresses of individuals with whom the user wishes to share the stak (step 803). The server engine may determine which users associated with the email addresses do not yet belong to the selected stak (step 805). The server engine may send invitations to join the stak to the email addresses of users who are not yet members (step 807). If a user accepts an invitation, the server engine may add the user to the member list of the selected stak (steps 809 and 811). The new stak may automatically appear automatically in that user's stak list on their software agent or user page. If a user has not already registered with the service provided by the server engine, the invitation may allow the user to register. In some implementations, upon successful registration, the server engine may add the user to the selected stak and the stak to the user's list of staks. In some implementations, the server engine may continue sending invitations until invitations have been sent to all the individuals the user invited (step 813).

In some embodiments, the owner of a stak may send invitations to users to join a private stak. In some embodiments, users may recommend public staks to a group of connections (e.g., friends, co-workers) by sending invitations to the public staks.

Figure 9:
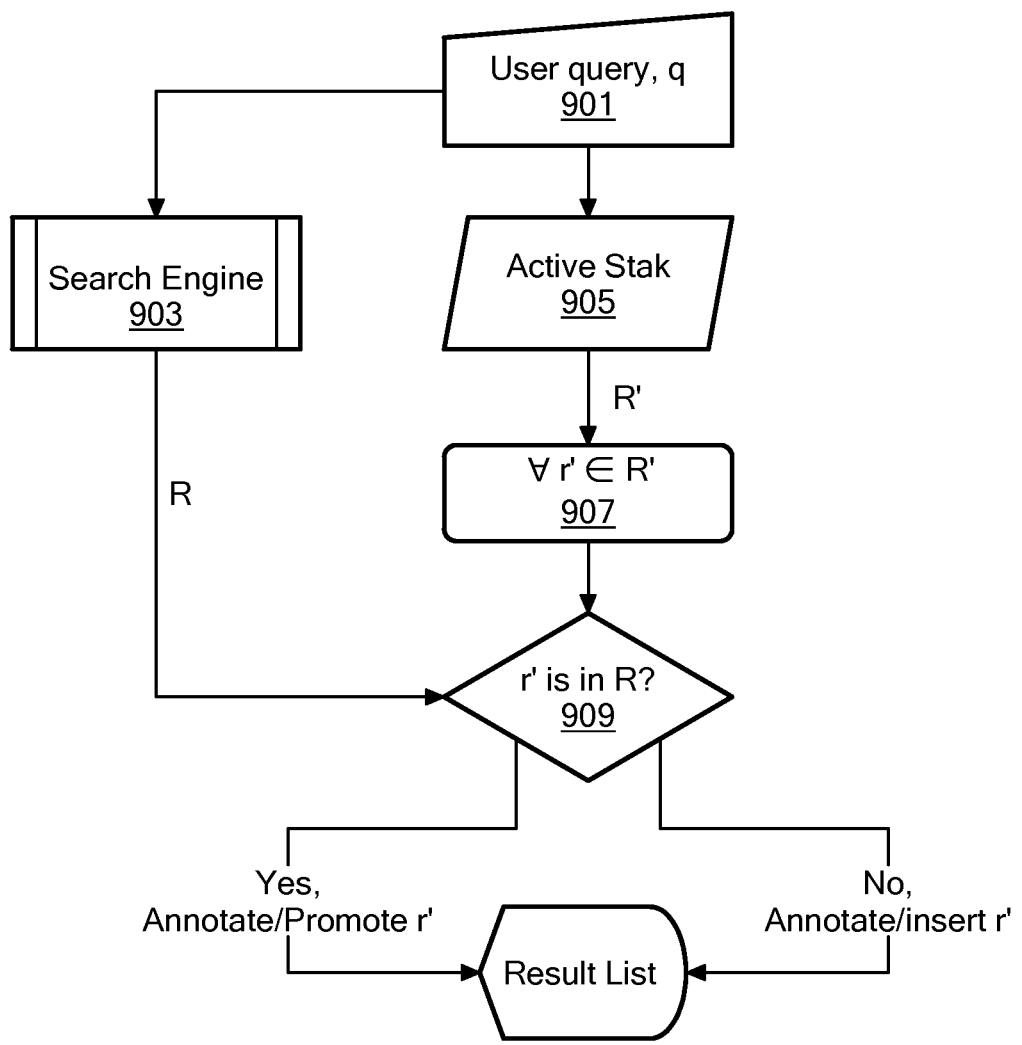
FIG. 9 is a flow diagram for an exemplary method of searching a query in the context of a simple stak.

Referring now to FIG. 9, a flow diagram for an exemplary method, according to some implementations, of searching a query in the context of a simple stak is shown and described. The user submits a search query "q" (step 901). The search engine the user has chosen searches its index for results related to "q" and obtains a set of search results, "R" (step 903). The search engine may retrieve results that contain at least one of the query's terms or tag fields. The search engine may search using standard, open-source full-text search technology, by way of example.

The server engine may search the stak for results, R', that may be relevant to the user's query "q" (steps 905 and 907). For each entry r' in R', e.g. $\forall e \in E$, the server engine may determine if the entry r' also belongs to R (step 909). If the entry r' does belong to R, the server engine may recommend (e.g., annotate and/or promote) the entry r' when displaying the search results R. If the entry r' does not belong to R, the server engine may annotate and/or insert the entry r' into the display of the search results R. In some implementations, as the process identifies search results that may have been useful to stak members in the past, the server engine may bring to the user's attention search results that already leverage the search knowledge of like-minded searchers.

Figure 10:
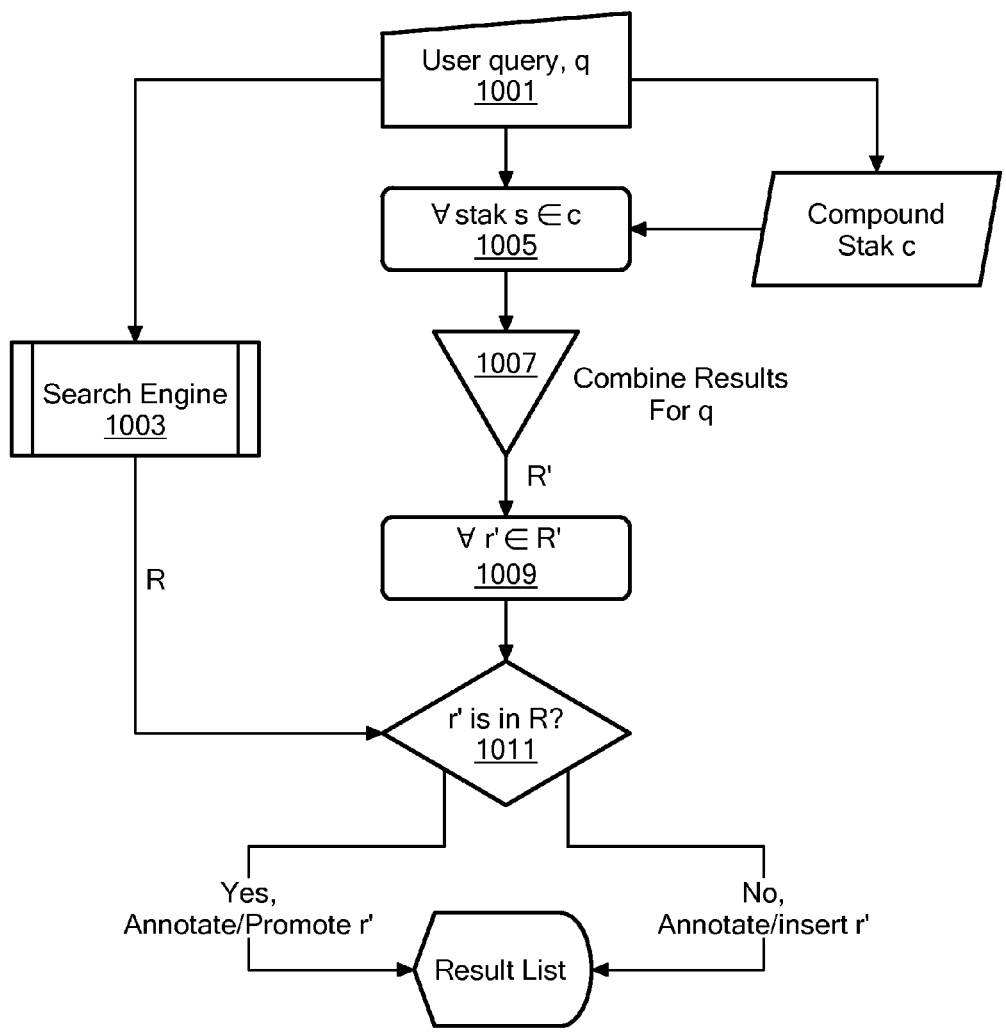
FIG. 10 is a flow diagram for an exemplary method of searching a query in the context of a compound stak.

Referring now to FIG. 10, a flow diagram for an exemplary method, according to some implementations, of searching a query in the context of a compound stak is shown and described. In general overview, for compound staks, the server engine searches for potentially relevant promotion candidates from the linked staks. Thus, users of a newly created compound stak may benefit from promotions derived from the search histories of more mature staks. For example, a user planning a vacation may link a "Vacation 2011" stak to pre-existing, mature staks such as "California Tours" or "Yosemite Adventures."

The user submits a search query "q" (step 1001) The search engine the user has chosen may search its index for results related to "q" and may obtain a set of search results, "R" (step 1003). In some implementations, for each stak linked to the compound stak, e.g., ∀stak s∈c, the server engine may search the stak index for results related to the query "q" (step 1005). The server engine may aggregate the results from the staks into a set of results R' (steps 1007 and 1009). In some embodiments, R' may be a ranked list of results from all the searched stak indexes.

For each entry r' in R', e.g., ∀e∈E, the server engine determines if the entry r' also belongs to R (step 1011). If the entry r' does belong to R, the server engine may recommend (e.g., annotate and/or promote) the entry r' when displaying the search results R. If the entry r' does not belong to R, the server engine may annotate and/or insert the entry r' into the display of the search results R.

In some embodiments, the method for promoting search results for a compound stak may be adjusted when the server engine selects the user's default stak for searching. The server engine may automatically select public staks that may be relevant to the user's search query. The server engine may temporarily link the public staks to the user's default stak. After the search ends, the server engine may remove the links between the staks and the user's default stak. By augmenting the user's search with results from the selected staks, the server engine may promote search results even if the user does not manually select a stak or belong to a stak relevant to the search query.

In some embodiments, the method for promoting search results for a compound stak may be adjusted when the server engine automatically selects more than one stak from the user's list of staks. For example, a user may belong to related staks, each addressing a different facet of an interest. A user planning a vacation may belong to a "US Travel" stak and a "California Wilderness" stak, by way of example. If the user submits a search query for "Yosemite cabins," the server engine may identify the "US Travel," "California Wilderness," and "Vacation 2011" staks in the user's list as relevant, potential sources for promotions. Thus, search results from the search engine may be enhanced with search knowledge from these three staks.

In some embodiments, search results from the staks may be recommended but not explicitly promoted. For example, the results may be displayed in an expandable area of the results page.

Figure 11:
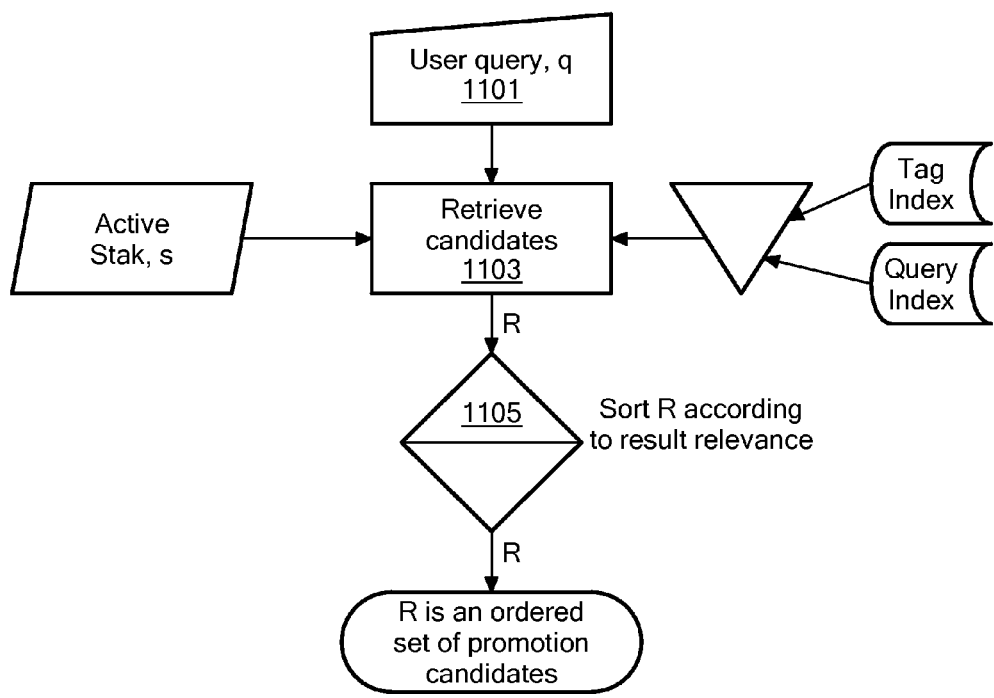
FIG. 11 is a flow diagram for an exemplary method of promoting search results from a stak.

Referring now to FIG. 11, a flow diagram for an exemplary method of promoting search results from a stak is shown and described. The user submits a search query "q" to a search engine (step 1101). The search engine may retrieve search results R for the search query "q" (step 1103). The server engine may retrieve search result candidates R' from the stak. In some implementations, the server engine may retrieve results that may contain at least one of the query's terms or tag fields. The search or the server engine may search using standard, open-source full-text search technology, by way of example.

In some implementations, the server engine may access information from the indexes of the stak (e.g., tag index, query index) for each search result candidate. Based on this information, the server engine may determine which search results to promote to the user's attention and re-order the results accordingly (step 1105). The server engine may display the search results with the promotions. In some embodiments, the server engine may display the search results as an ordered set, according to the promotions. In some embodiments, the search engine may highlight promoted search results. In many embodiments, the search engine may display promoted search results in a separate area from the non-promoted search results.

The server engine may determine which search results from the stak to promote by computing relevance scores. The relevance score may correspond to the search result's relevance to the user's search query q in the context of the searched stak. Various techniques may be used to compute the relevance score. In some embodiments, a scoring technique may combine historical, behavior-based indicators of relevance with the scoring function that the underlying search and indexing technology applies during its retrieval process.

A scoring technique may confer a higher relevance score for web pages with higher numbers of user selections via user clicks. A scoring technique may confer a higher relevance score for web pages that users spent more time browsing. A scoring technique may account for information on discussion forums, search results tagged by other users, information available on social networks about topics of interest to the user, web sites that scan and aggregate information from other sites (e.g., sources of RSS feeds), or any other source of information available over a network. A scoring technique may account for the amount and type of feedback about a search result from other members of the stak. A scoring technique may account for aggregate interaction levels across a portion of, or across all of sources of search results, the number of sources of search results associated with the search result, or both.

Scoring techniques may confer higher relevance scores with a threshold number of user selections to prevent results that were accidentally selected for a few search queries from being promoted. Scoring techniques may confer higher relevance scores to search results meeting time-based criteria to prevent results that had not been recently selected from being promoted.

In some embodiments, scoring techniques may account for explicit feedback from users for search results to determine whether a result should be promoted. For example, if a user gave a "thumbs down" for a search result discovered in the context of the same query that another user has submitted, the server engine may conclude the search result appears relevant based on its selection history but actually represent an irrelevant result for the query. Thus, the server engine may choose not to promote the search result.

In some embodiments, tagged web pages or other web resources added by users to a stak may be promoted for relevant searches. The server engine may distinguish URLs added to a stak via selection of a search result, as opposed to URLs added via tagging. Thus, different promotion strategies may be used for search results and bookmarks, by way of example.

The server engine may integrate promotion candidates with results normally returned from the search engine. For example, the server engine may augment search results normally displayed to the user by the search engine by highlighting results that have been selected by other members of the stak. In some embodiments, candidate promotions are extracted from the list of search engine results and displayed as a separate group of recommendations to the user.

In some embodiments, the server engine may promote a search result r' if the result exists in both sets of search results returned by the search engine and the server engine. In some embodiments, the server engine may promote a search result via in-place promotion. The search result r' may remain in its default position in the search engine's list of search results. However, if the search result's relevance score meets a threshold, the server engine may annotate the search result r' with information from the stak. For example, the information may include how recently the search result r' was selected by another user searching within the stak, how often the search result r' has been selected by stak members, and the search query terms that have been used when the search result r' had been selected by other users. The information may include a snippet of a webpage linked by the search result. Thus, users may recognize search results that have been helpful or relevant to other searchers and gain information that may aid in their search process.

In some embodiments, the server engine may promote a search result by adjusting the result's position in the search engine's list of results. For example, the server engine may move the search results with the three highest promotion or relevance scores to the top of the search results list. The adjusted search results may be annotated with information from the stak, as in in-place promotion. In some embodiments, the server engine may adjust a search result's position only if the result's relevance score exceeds a threshold. The threshold for adjusting a result's position may be larger than the threshold for promoting a search result in-place.

In some embodiments, the server engine may promote a search result r' if the result exists in the set of search results returned by the server engine, but not the set returned by the search engine. If stak members have found the search result r' useful or relevant, the server engine may add the search result r' to the search engine's list of results. In some embodiments, the server engine may insert the search results from the stak with the three highest promotion scores at the top of the search results list. The server engine may insert the search results if their relevance scores exceed a threshold, thereby preventing spurious, accidental, or malicious result selections from being inserted.

In any of these embodiments, thresholds for the promotions may be established for all the staks on the server engine. Thresholds for in-place promotion, position adjustment, and/or insertion may be set for each stak by the stak owner. In some embodiments, the thresholds may be set on a user-by-user basis. When the server engine retrieves results from a compound stak, the server engine may apply an additional compound stak promotion threshold to the search results. The compound stak promotion threshold may adjust the relevance scores of the search results via weighting.

In any of the embodiments, search results from multiple search engines may be combined into a list of search results. The server engine may identify search results for promotion.

In many embodiments, the server engine may display the context in which other users discovered promoted results. The context may account for the stak, search query terms, and popularity of the search result within the stak, by way of example. Context information may provide users with additional information that may assist users in subsequent searches. By understanding how other stak members found a search result to be useful, users may formulate improved queries or otherwise adapt their search queries. Context information for a promoted search result may provide links for locating additional information. For example, by selecting the stak associated with a promoted result, the user may access further information about the stak, such as related search queries and search results.

In various embodiments, while the user browses web pages, the server engine may retrieve information about a webpage the user is viewing. The server engine may display information such as past search queries that led to the web page's selection by a user, annotations to the webpage (e.g., user comments), and information on the web page's hyperlinks that previous searches had followed. The information may be displayed and/or highlighted to guide the user's next steps in searching.

In some embodiments, the server engine may pare search results from staks. As the server engine develops staks via information from search behavior (e.g., submitted search queries and selected search results), the staks may become contaminated with irrelevant data or other noise. For example, users may select search results that ultimately do not satisfy their search needs. Users may select search results relevant to their needs, but in the context of a stak centered on different subject matter. Spammers may submit search queries to a search engine and then select web pages they own, thereby encouraging the server engine to promote their web pages when other users search.

The server engine may detect suspicious activity and/or temper the results from user search activity. In some examples, the server engine may monitor click patterns from users to detect if users are attempting to promote their own web pages. In another example, the server engine may implement decay functions to prevent promoted results from becoming unduly promoted, since users are likely to select results that appear at the forefront of the list of results.

In some embodiments, the server engine may calculate a reputation score for each user. The reputation score may be based on the frequency with which their search results, tags, votes, or shares result in search result recommendations that other users select. Thus, the reputation score may be a proxy to how helpful such users are to others. In some embodiments, when users add information to a stak and another user benefits from the added information, the reputation scores of the users who added information may increase. In many embodiments, the server engine may use the reputation score to rank search result selections from more reputable users.

A few examples using the features of the system 1 are now described. In a first example, a user may create a simple, private stak of limited membership and duration. The stak will be used to facilitate the accomplishment of an undertaking by a group of people, such as friends or colleagues. The stak serves as a repository for searches to be communicated to the group. Thus, a user may create a "Vacation 2011" stak for a group of people wishing to plan a vacation together. As the stak owner, the user may send invitations to the group to join the stak.

The user or the server engine selects the "Vacation 2011" stak whenever the user searches for information relating the vacation. When the user selects a search result from results retrieved in response to a query, the server engine stores the search result in the stak. Other members of the stak may view the selected search result. In some embodiments, the selected search result may be promoted to the other members as they conduct their own searches. When a user wishes to re-find a result, they may submit the same or similar query to their search engine and the server engine may promote the result from the stak. Likewise, other group members may benefit from promotions that are derived from the searches of others within the group.

As each member of the group searches, each member adds new search knowledge to the stak. As the stak knowledge, the server engine may detect when members of the group are searching to plan the vacation, even if the members have not explicitly selected the "Vacation 2011" stak. For example, if a user searches for "Yosemite cabins," if other members of the stak had searched with query terms like "Yosemite" and "cabins," the server engine may predict that the "Vacation 2011" stak is relevant and set the stak accordingly. In various embodiments, previously submitted search queries by the user, selected search results from those queries, and stak metrics (number of members, level of search activity, volume of search knowledge) may be used to select a stak.

The "Vacation 2011" stak may be limited to a small number of users and a predetermined period of time. Nevertheless, other users may benefit from the "Vacation 2011" stak as they plan their own vacation. In some embodiments, the system 1 may make such staks accessible and searchable to other users.

In another example, a public stak may contemplate a larger number of members as the stak is promoted as a general source of expert search knowledge for a topic. For example, a business owner may create a stak called "Bob's Cars" and seed the stak web pages and search queries imported from the business owner's on-line bookmarks. The business owner may share the stak via e-mail with individuals on his customer list. As the customers contribute search knowledge to the stak, they assist other users in locating relevant and interesting search results.

As the business owner incorporates information about recent and popular searches into his business's web page and content structure, the stak may begin to serve as a form of content for the web page. Users of the stak may create their own staks, some of which may offer more specialized searches. Users may create staks that link to "Bob's Cars" such that promoted results from "Bobs Cars" may appear in staks such as "Vintage Jaguars" and "The UK Vintage Car Club." Users of those staks may be redirected to the business owner's website as they recognize the value of the search result promotions received from the "Bob's Cars" stak.

In another example, a public stak may be owned by an influential blogger or owner of a prominent web site. In one example, TechScrunch.com may be a leading blog on technology. Over 1 million readers may routinely check the site for the latest news on technology related matters. If a substantial number of the readers join a "Tech Scrunch" stak, the stak may become an attractive repository of technology-related search knowledge. Smaller compound staks may link to the "Tech Scrunch" stak, thereby enabling additional users to locate relevant technology-related search results. Thus, the "Tech Scrunch" stak's reach may ultimately generate significant advertising revenue for its creators.

While various embodiments of the methods and systems have been described, these embodiments are exemplary and in no way limit the scope of the described methods or systems. Those having skill in the relevant art may effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A searching system comprising a primary server comprising interfaces for communication with databases or with underlying search engines, wherein the primary server is configured to:
    receive, by a processor of a primary serve, a search query from a client under instructions from a user;
    receive, by the processor, a selection of a data set for augmenting search results to be provided in response to the search query, wherein the data set comprises prior search queries, prior search results associated with the prior search queries, and selections of the prior search results;
    receive, by the processor, from a third party search engine, a plurality of search results associated with the search query;
    determine, by the processor, one or more search results of the plurality of search results to provide to the client in response to the search query based at least in part on the data set; and
    provide, by the processor, the one or more search results for display on a graphical user interface of the client;
    wherein the primary server is configured to:
        automatically update the data set according to results of the one or more search results selected by the user; and
        control a Web site configured to provide each subscribed user with access to pages that provide:
            access to data feeds concerning recent activity in the user's data sets,
            one or more tools for filtering recent activity data under a category,
            a set list configured to show data sets that a user is a member of and provide summary information on each,
            a display of a user's search communities,
            a data set recommendation configured to provide a user with recommendations of data sets that they might be interested in joining,
            searching for results that have previously been selected in a data set by entering queries, and
            browsing of a data set for which the user is a member and public search data sets.

2. The searching system as claimed in claim 1, wherein the primary server is adapted to automatically generate the data a set according to tagging of results by members of the data set.

3. The searching system as claimed in claim 2, wherein said tagging includes a vote quantifier applied by a member to a result.

4. The searching system as claimed in claim 1, wherein the data set includes both Web site and individual Web page results.

5. The searching system as claimed in claim 1, wherein the primary server is adapted to apply an identifier to the data set in response to a user instruction and to associate members with the data set in response to user instructions.

6. The searching system as claimed in claim 1, wherein the system further comprises a social network server adapted to communicate with the primary server and to manage a plurality of data sets, and the primary server is adapted to communicate with the social network server to update and select the data set.

7. The searching system as claimed in claim 6, wherein the primary server is a Web server and is adapted to operate a Web site which allows interaction with the social network server for associating members with the plurality of data sets; and wherein the system is adapted to transmit invitations to users identified in the social network server to become members of at least one of the plurality of data sets.

8. The searching system as claimed in claim 1, wherein the system is adapted to manage compound data sets containing related data sets.

9. The searching system as claimed in claim 1, wherein the server is adapted to download to a client system a software agent having software code and settings configured to allow access by the client system to the primary server, and to:
create a new data set,
share data sets with other users,
allow the client system to share individual data set items directly with other users or with entire communities of which they are a member,
allow the client system to share individual data items directly with other users or with entire communities of which they are a member by means of a single click on a button or control, and
provide users with lists of data sets of which they are currently members.

10. The searching system as claimed in claim 9, wherein the software agent allows the client system to:
resubmit a query to the primary server upon selection of a data set, retrieve a recommendation relevant to a selected search data set,
automatically identify and select a search data set suitable to a current search by analysis of a current search context,
output recent search activity and search statistics, and
select a search data set suitable to a search as a query is being entered, with dynamic updating of the selection.

11. The searching system as claimed in claim 9, wherein the software agent allows the client system to:
under user instructions, enter the search query including a trigger to identify which data set they would like to search in the context of, re-rank and annotate the results of the response using historical usage information derived from the data sets, and
augment the results of the response with additional results taken from the data set that is identified as being relevant to a current search.

12. The searching system as claimed in claim 9, wherein the software agent allows the client system to:
process historical information associated with results taken from a data set as part of evidence-based filters to decide upon a result's relevance to a current search, use reputation information derived from historical actions of data set members to adjust the ranking of results selected by those members when recommending those results in response to new queries,
access a tagging function whereby a result can be tagged with a set of keywords and added to a data set,
re-use page tags provided by users to augment a response to a query whose terms overlap with tag terms or a result, and
allow users to populate data sets with data from external sources, for integration with existing set data or to seed new sets.

13. The searching system as claimed in claim 9, wherein the software agent allows the client system to:
export data set content n a format that may be imported into external data sources or stored for backup purposes, and
generate a compound data set that draws upon the content of other search data sets when identifying suitable historical search information to present the end-user with.

14. The searching system as claimed in claim 9, wherein the software agent allows the client system to:
navigate through the results with results being pre-cached to improve response times, allow the user to tag or share a previewed result, or to open the result in a new browser tab, and
configure search settings.

15. The searching system as claimed in claim 12 wherein a user's reputation score is calculated based on the extent to which their search actions within a particular search data set assist other users to locate relevant information.

16. The searching system as claimed in claim 1, wherein the primary server is adapted to embed widgets in external Web pages or Web page containers, providing users with access to content.

17. The searching system as claimed in claim 1, wherein the primary server is adapted to enable the user to apply settings on each data set of which they are a member.

18. The searching system as claimed in claim 17, wherein said settings include extent of access to data concerning other users of a service for the data sets, and whether searching actions will result in the data set content being updated.

19. The searching system as claimed in claim 1, wherein the server is adapted to allow an owner of a data set to set permissions on the data set at a global, individual, or role-based level, to control whether different searching actions will result in the set content being updated.

20. The searching system as claimed in claim 1, wherein the system comprises an automatic update component adapted to automatically download any update-codes that are available from an appropriate update server, said update codes providing instructions for parsing additional underlying search engines so that data sets include results that have been selected as part of other search engine result-lists and so that results from data sets can be inserted as part of other search engine result lists.

21. The searching system as claimed in claim 1, wherein the primary server is adapted to download a software agent to the client system to allow a user to benefit from results that have been selected from different search engines, wherein new search engines can be added in update codes, and whereby the user benefits from results from different search engines without needing to access separate meta search engines.

22. The searching system as claimed in claim 1, wherein the primary server is adapted to provide an interface that allows any software agent to utilize the functionality of the primary server.

* * * * *